(12) United States Patent
Smith et al.

(10) Patent No.: US 7,860,966 B2
(45) Date of Patent: Dec. 28, 2010

(54) USER INTERFACE PROVISIONING

(75) Inventors: David J. Smith, East Greenwich, RI (US); David A. Cardimino, Jr., Warwick, RI (US)

(73) Assignee: American Power Conversion Corporation, West Kingston, RI (US)

( * ) Notice: Subject to any disclaimer, the term of this patent is extended or adjusted under 35 U.S.C. 154(b) by 1458 days.

(21) Appl. No.: 10/668,620

(22) Filed: Sep. 23, 2003

(65) Prior Publication Data
US 2006/0143289 A1 Jun. 29, 2006

(51) Int. Cl.
G06F 15/173 (2006.01)
G06F 9/445 (2006.01)

(52) U.S. Cl. .................... 709/224; 717/176

(58) Field of Classification Search .......... 709/223, 709/224; 717/170, 176–178
See application file for complete search history.

(56) References Cited

U.S. PATENT DOCUMENTS

| | | | |
|---|---|---|---|
| 6,363,422 B1* | 3/2002 | Hunter et al. | 709/224 |
| 6,459,175 B1* | 10/2002 | Potega | 307/149 |
| 6,609,158 B1* | 8/2003 | Nevarez et al. | 719/316 |
| 6,704,807 B1* | 3/2004 | Mathur et al. | 719/328 |
| 6,792,462 B2* | 9/2004 | Bernhardt et al. | 709/225 |
| 7,181,440 B2* | 2/2007 | Cras et al. | 707/2 |
| 7,185,078 B2* | 2/2007 | Pleyer et al. | 709/223 |
| 7,197,559 B2* | 3/2007 | Goldstein et al. | 709/224 |
| 7,203,753 B2* | 4/2007 | Yeager et al. | 709/225 |
| 7,284,033 B2* | 10/2007 | Jhanji | 709/206 |
| 7,480,077 B2* | 1/2009 | Peeters | 358/1.9 |
| 2003/0033550 A1* | 2/2003 | Kuiawa et al. | 713/340 |
| 2003/0061335 A1* | 3/2003 | Thomas et al. | 709/223 |
| 2004/0024868 A1* | 2/2004 | Drummond, II | 709/224 |
| 2007/0005685 A1* | 1/2007 | Chau et al. | 709/203 |
| 2007/0198709 A1* | 8/2007 | Hawkinson et al. | 709/224 |

OTHER PUBLICATIONS

International Search Report for PCT/US04/31499, mailed Nov. 8, 2005.

* cited by examiner

*Primary Examiner*—Larry Donaghue
(74) *Attorney, Agent, or Firm*—Townsend and Townsend and Crew LLP

(57) ABSTRACT

A system for use with electric equipment includes a first input/output (I/O) device configured to couple to the electric equipment, a monitor coupled to the first I/O device and configured to determine information regarding the electric equipment, a second I/O device configured to communicate with a communication network, a memory that stores a computer-executable program configured to be executed by a computer to provide a computer interface for providing indicia of the information regarding the electric equipment, the computer interface being in a format that is distinct from a network browser format, and an interface-provisioning device configured to convey the computer-executable program toward the computer via the second input/output device and the communication network.

28 Claims, 4 Drawing Sheets

USER INTERFACE PROVISIONING

FIELD OF THE INVENTION

The invention relates to interfacing with a device that monitors another device, e.g., by enabling a Windows® interface application via a web browser.

BACKGROUND OF THE INVENTION

Many devices and systems exist for monitoring data over a network. World-wide-web browsers can be used to access servers to monitor a wide range of information, such as weather reports, sports, headline news, etc. Web browsers can also be used to access servers to monitor data regarding operation of other devices or equipment, etc. For example, web browsers can be used to communicate with uninterruptible power supply (UPS) servers to monitor performance of UPSs for operational information including, e.g., last switchover to battery backup, number of battery switchovers in a given period of time, duration of battery backups, etc.

When using web browsers to remotely monitor information over a network, the user is typically presented with a Hypertext Markup Language (HTML) interface. These interfaces are familiar to web browser users, but are less desirable in some respects than other interfaces. HTML interfaces typically have poorer graphics capabilities than standard computer-resident interfaces. HTML interfaces also typically have slower response times than computer-resident interfaces due to the need to relay information back and forth between the browser and the server over the network. This back and forth communication is subject to network congestion, connection speed, and other factors affecting communication speed.

SUMMARY OF THE INVENTION

In general, in an aspect, the invention provides a system for use with electric equipment, the system including a first input/output (I/O) device configured to couple to the electric equipment, a monitor coupled to the first I/O device and configured to determine information regarding the electric equipment, a second I/O device configured to communicate with a communication network, a memory that stores a computer-executable program configured to be executed by a computer to provide a computer interface for providing indicia of the information regarding the electric equipment, the computer interface being in a format that is distinct from a network browser format, and an interface-provisioning device configured to convey the computer-executable program toward the computer via the second input/output device and the communication network.

Implementations of the invention may include one or more of the following features. The computer-executable program is configured to execute an interface application. The computer-executable program comprises the interface application. The computer-executable program is configured to obtain the interface application. The computer-executable program is configured to determine whether a desired version of an interface application is stored by the computer and if not, then to obtain the interface application.

Implementations of the invention may also include one or more of the following features. The computer-executable program is an ActiveX control. The interface is a Windows®-based interface. The monitor and the interface-provisioning device comprise software code. The system is an uninterruptible power supply system further comprising an AC power input configured to receive AC power, a DC power source, an output circuit including a power output, and a controllable switch coupled to the AC power input, the DC power source, and the output circuit and configured to selectively couple at least one of the AC power input and the DC power source to the output circuit. The monitor is configured to determine information regarding at least one of air-conditioning equipment, a smart generator, a leak detector, a power distribution unit, an environmental monitoring device, and an automatic transfer switch.

In general, in another aspect, the invention provides a computer program product residing on a computer-readable medium on a system coupled to electronic equipment, the computer program product comprising computer-readable and computer-executable instructions for causing a computer to determine indications of operation of the electronic equipment, and convey a computer-executable program to a network toward a remote device to be executed by the remote device, the computer-executable program being configured to execute an interface application to provide a user interface for providing information regarding the operation of the electronic equipment, the interface being in a format different from a network-browser format.

Implementations of the invention may include one or more of the following features. The computer-executable program comprises the interface application. The computer-executable program is configured to obtain the interface application. The computer-executable program is configured to determine whether a desired version of an interface application is stored by the remote device and if not, then to obtain the interface application. The computer-executable program is an ActiveX control. The interface is a Windows®-based interface.

In general, in another aspect, the invention provides an uninterruptible power supply (UPS) system comprising an AC power input configured to receive AC power, a DC power source, an output circuit including a power output, a controllable switch coupled to the AC power input, the DC power source, and the output circuit and configured to selectively couple at least one of the AC power input and the DC power source to the output circuit, a first input/output (I/O) device configured to connect to couple to electric equipment, a monitor coupled to the first I/O device and configured to determine information regarding at least one of power use and power needs of the electric equipment, a second I/O device configured to communicate with a communication network, a memory that stores a computer-executable program configured to be executed by a computer to provide a computer interface for providing indicia of the information regarding the UPS system, the computer interface being in a format that is distinct from a network browser format, and an interface-provisioning means for conveying the computer-executable program toward the computer via the second input/output device and the communication network.

Implementations of the invention may include one or more of the following features. The computer-executable program comprises an ActiveX control. The interface is a Windows®-based interface.

In general, in another aspect, the invention provides a method of providing information regarding electronic equipment, the method comprising, monitor operation of the electronic equipment, receiving an information request regarding the electronic equipment from a network browser application of a requesting device, and executing a computer-executable user-interface program at the requesting device to produce a user interface for providing information regarding the operation of the electronic equipment, the interface being in a first format that is distinct from a second format associated with the network browser application.

Implementations of the invention may include one or more of the following features. The method further comprises attempting to determine whether the requesting device currently stores a desired version of the computer-executable user-interface program. The method further comprises transferring the computer-executable program to the requesting device if the attempting to determine fails to determine that the requesting device currently stores the desired version of the computer-executable user-interface program. The method further comprises transferring the computer-executable program to the requesting device if the attempting to determine determines that the requesting device does not currently store the desired version of the user-interface computer-executable program. The method further comprises abstaining from transferring the computer-executable program to the requesting device if the attempting to determine determines that the requesting device currently stores the desired version of the computer-executable user-interface program. The method further comprises instructing the requesting device to execute the computer-executable user-interface program stored by the requesting device.

Implementations of the invention may also include one or more of the following features. The method further comprises transferring an address of a network server accessible from the remote device to the remote device, and accessing the network server from the remote device and transferring to the remote device at least one of the computer-executable user-interface program and a computer-executable loader program configured to determine whether a desired version of the user-interface program is stored in association with the remote device. The user-interface program comprises an ActiveX control. Executing the user-interface program produces a Windows®-based user interface. The method further comprises controlling the electronic equipment by manipulating the user interface.

In general, in another aspect, the invention provides a computer program product for use with a first electronic device configured to monitor a second electronic device, the computer program product residing on a computer-readable medium and comprising an ActiveX control comprising computer-readable and computer-executable instructions for causing a computer to at least one of produce a Window®-based user interface on a display of the first device for providing information regarding the operation of the electronic equipment, and determine whether a desired version of an interface-producing program is stored in association with the first device, the interface-producing program being configured to produce a Window®-based user interface on the display of the first device for providing information regarding the operation of the electronic equipment.

Implementations of the invention may include one or more of the following features. The instructions are configured to cause the computer to access a remote server and download the desired version of the interface-producing program if the computer program product fails to determine that the desired version of the interface-producing program is stored in association with the first device.

Various aspects of the invention may provide one or more of the following advantages. A web-enabled Windows®-based interface can be provided to a computer. The interface can be provided without requiring installation of the interface on the computer. A non-HTML interface can be provided via a web browser. A server interface can be provided without requiring maintaining two different interfaces on a computer. A web-enabled UPS interface can be provided with better response time than an HTML interface, and/or with the look and feel of a Windows® interface. A software interface can be provided to a computer remotely without downloading software and running a separate installation for the software. A software interface can be provided to a computer without using physical storage media such as floppy disks or compact disks to install the interface. An HTML interface in its entirety, or at least for device management, can be eliminated. HTML interface testing and maintenance can be reduced.

These and other advantages of the invention, along with the invention itself, will be more fully understood after a review of the following figures, detailed description, and claims.

DETAILED DESCRIPTION OF PREFERRED EMBODIMENTS

At least some embodiments of the invention provide techniques for providing a web-enabled Windows®-based interface application. A computer user can direct the computer's web browser to a server containing desired software for monitoring data of interest. For example, the browser can point to a server with UPS software for monitoring performance metrics of a UPS. While the description below focuses on UPSs, other devices (especially networked devices) may be used. The server can check whether the computer has an interface application associated with the server and if not, to download the interface application to the computer. The interface application is provided in the form of an ActiveX control that is stored in cache at the computer, without requiring the user to install the interface application on the computer. With the interface application cached at the computer, the application is executed to provide the computer user with a Windows®-based interface. The user can interact with the server through a familiar interface that is consistent with other interfaces for other software applications on the computer. Other embodiments are within the scope and spirit of the invention.

Figure 1:
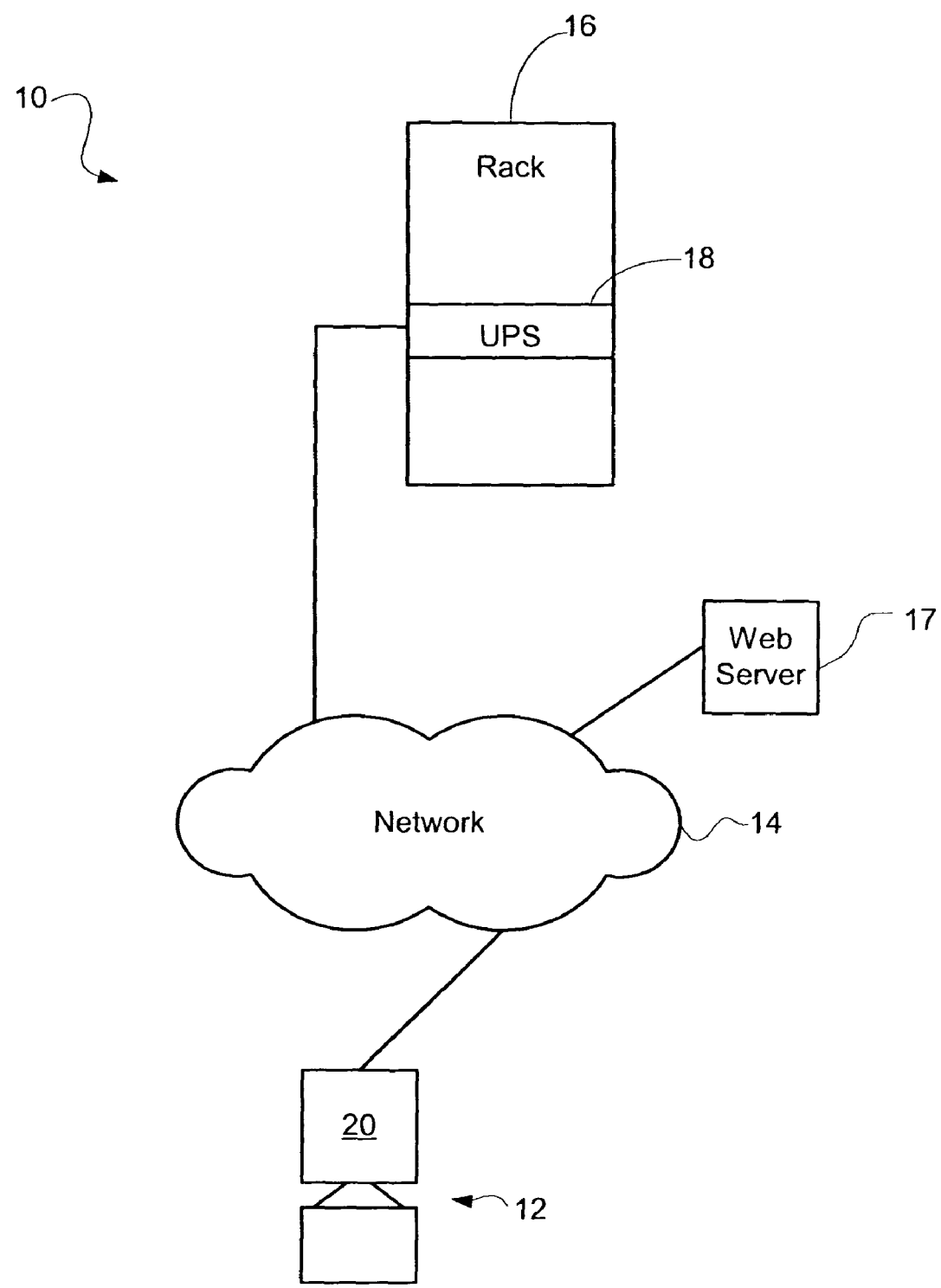
FIG. 1 is a simplified diagram of an uninterruptible power supply monitoring system.

Referring to FIG. 1, an uninterruptible power supply (UPS) monitoring system 10 comprises a computer 12, a communication network 14, a rack 16 of equipment, a UPS 18 in the rack 16, and a web server 17. The UPS 18 is configured to communicate with the computer 12 via the network 14. Although only one rack 16 and one UPS 18 is shown, other numbers of racks 16 and/or UPSs 18 would be acceptable, such as two, three, or more racks 16 with one UPS 18 per rack 16, or multiple racks 16 per one UPS 18. With multiple UPSs 18, the UPSs 18 could each communicate with the computer 12 via the network 14 or, some or all of the UPSs 18 could communicate with each other and less than all, e.g., one, of the UPSs 18 could communicate with the computer 12. The network 14 is preferably a packet-switched network such as a local area network (LAN), a wide area network (WAN), or the global packet-switched network known as the Internet, although other networks would be acceptable. Each of the racks 16 includes rack-mounted equipment, such as telecommunications equipment, computer servers, etc., for which backup power is provided by the respective UPS 18. The UPSs 18 are configured to provide the backup power and to provide information regarding use of the backup power via the network 14 to the computer 12. The computer 12 includes a display screen 20 for displaying an interface to show the information regarding use of the backup power provided by the UPS 18.

Figure 2:
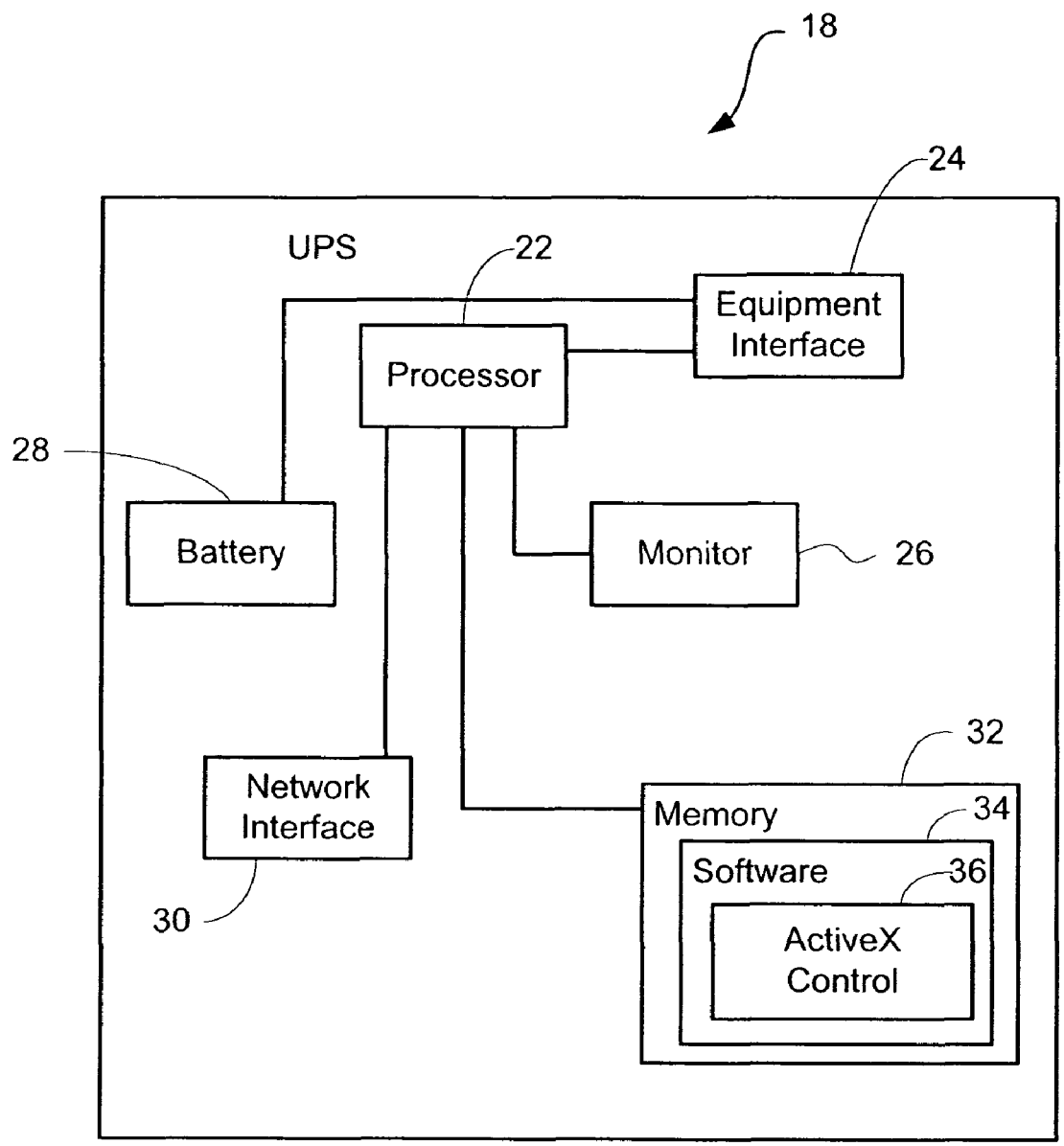
FIG. 2 is a simplified block diagram of an uninterruptible power supply shown in FIG. 1.

Referring also to FIG. 2, the UPS 18 includes a processor 22, an equipment interface 24, a monitor 26, a battery 28, a network interface 30, and a memory 32. The equipment interface 24 is connected to the monitor 26 and is configured to connect to the equipment mounted in the rack 16 to relay information regarding power availability and/or use to the monitor 26. The monitor 26 is configured to monitor the power use/availability of/at the equipment and provide indicia to the processor 22 regarding whether backup power is needed. The processor 22 is configured to determine when battery power is needed and to control the equipment interface 24, that is also connected to the battery 28, to supply power from the battery 28 to the equipment in the rack 16 that needs backup power. The processor 22 is further configured to provide information regarding use of the backup power to the computer 12 via network interface 30 and the network 14. The processor 22 is configured to perform its various functions by reading and executing computer-readable, computer-executable software instructions 34 stored in the memory 32.

Included in the software 34 stored in the memory 32 is an ActiveX control 36 for providing a non-HTML interface, preferably a Windows®-based interface, for the computer 12. The ActiveX control 36 can be downloaded to the computer 12 via the network 14 and executed by a web browser resident on the computer 12. The control 36 will have full access to the Windows® operating system of the computer 12.

Figure 3:
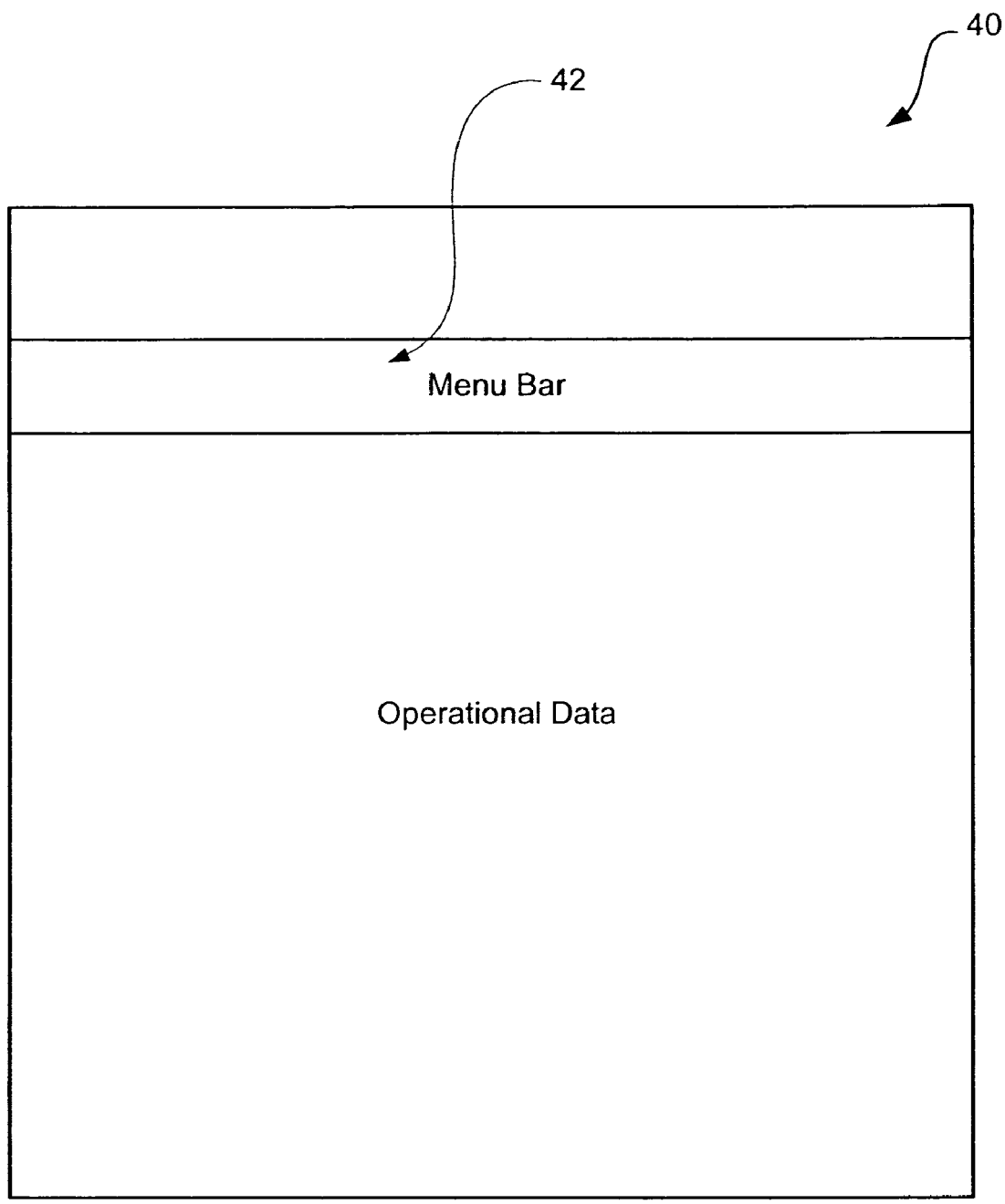
FIG. 3 is a simplified diagram of a display produced by the system shown in FIG. 1.

Referring also to FIG. 3, the control 36 is preferably configured to produce a Windows®-based interface such as the interface 40 shown in FIG. 3 on the display 20 of the computer 12. As shown, the interface 40 has a format that is familiar to those that use a Windows® operating system. The interface may have the same tool bar 42 as other Windows® interfaces, including the ability to customize the tool bar as the user of the computer 12 chooses, although different tool bars, or none at all, may be used. The interface 40 includes a data portion 44 that shows data regarding operation of monitored equipment, here the UPS 18 and/or power use and/or availability at the rack 16, e.g., for the rack 16 as a whole or for individual pieces of equipment in the rack 16. The interface 40 also provides graphics capabilities of a Windows® application that are greater than HTML interfaces graphics capabilities/limits.

The processor 22 is configured to execute the software instructions 34 to provide a web server for providing information regarding the UPS 18. The processor 22 can interact with the computer's web browser to supply the ActiveX control 36 for providing the interface 40, and for providing data shown by the interface regarding the UPS status and usage, e.g., number of battery backups used, when, for how long, for which pieces of equipment and/or rack 16 (if the system 10 includes multiple racks 16), etc. The computer's web browser can access the web server via the network 14 and inquire regarding the UPS 18. Alternatively, a shortcut may be provided on the computer 12 for making UPS information inquiries to the web server of the UPS 18. In such cases, the computer 12 may not be equipped with a web browser. In response to UPS information inquiries, the processor 22 can provide the desired information. With the interface 40 provided to any computer browser that accesses the UPS 18, the interface is consistent and available to any computer with a browser without needing to install specific UPS software on the individual computers.

The processor 22 is configured to determine whether the current version of the ActiveX control 36 is resident on the computer 12. If the computer 12 does not have the current ActiveX control 36, then the processor 22 will supply/download the current ActiveX control 36 from the memory 32 with instructions for the computer 12 to store the downloaded ActiveX control 36 in memory, preferably cache memory, of the computer 12, and to execute the control 36. If the processor 22 determines that the computer 12 does have the same version of the control 36 as in the memory 32, then the processor 22 instructs the computer 12 to execute the control 36 stored at the computer 12. Executing the control 36 causes an application for producing the interface 40 to be stored locally, e.g., in cache memory of the computer. Preferably, the computer 12 stores the downloaded ActiveX control and application locally, but it could store the control 36 and/or application remotely and this would still be considered being stored "at" the computer 12. With interface software cached locally, network communications are not needed to produce the graphics of the interface 40 and thus the interface 40 is quicker than using an interface for which the graphics are supplied via the network 14, e.g., an HTML interface.

The ActiveX control 36 can be updated as appropriate at the UPS 18. An update to the control 36 can be done once and is instantly universally available for any computer that thereafter accesses the UPS 18 for power information. Preferably, when the control 36 is updated, the previous version of the control 36 is discarded such that the only ActiveX control 36 stored in the memory 32 is the currently active control 36. The previous version may, however, be stored, e.g., so that if another networked device specifies that it uses the old version, the previous version is still on the client computer 12. Thus, multiple versions may reside on the client computer 12.

Figure 4:
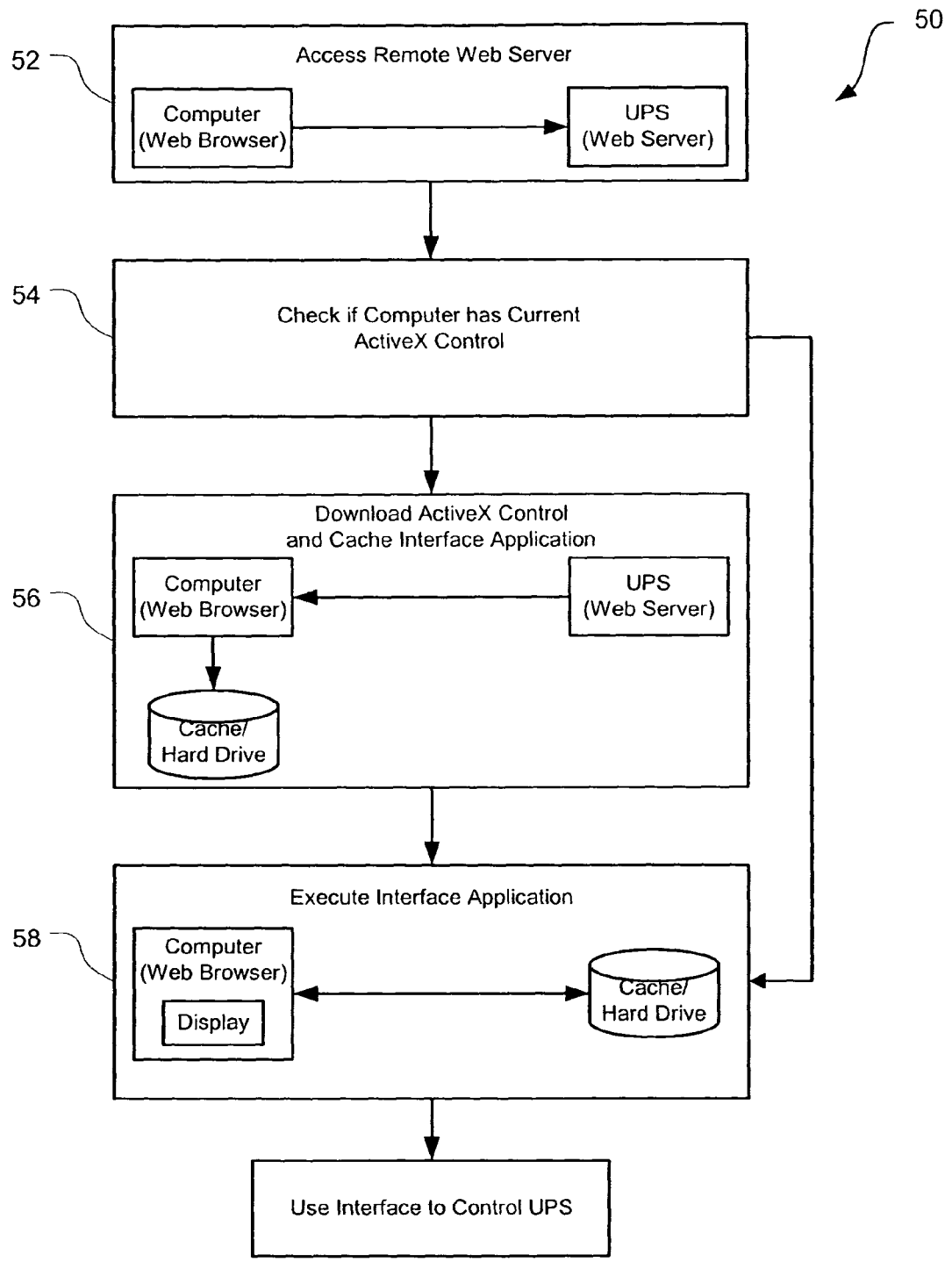
FIG. 4 is a block flow diagram of providing a user interface using the system shown in FIG. 1.

In operation, referring to FIG. 4, with further reference to FIGS. 1-3, a process 50 for providing the interface 40 to a user of the computer 12 using the system 10 includes the stages shown. The process 50, however, is exemplary only and not limiting. The process 50 may be altered, e.g., by having stages added, removed, or rearranged.

At stage 52, the computer 12 accesses the UPS 18 to receive UPS information, e.g., regarding power supplied by the UPS 18. A user of the computer 12 operates a web browser of the computer 12, or a shortcut provided on the computer 12, to access a web page provided by the UPS 18 for accessing UPS information.

At stage 54, the computer 12 checks whether the computer 12 needs to download the current version of the ActiveX control 36 used by the UPS 18. In response to the computer 12 accessing the web page provided by the UPS 18, the web page specifies the ActiveX control class, version, and download path. The computer 12 checks as to whether the computer 12 is storing the same class and version of the ActiveX control 36 that is in the UPS's memory 32. This inquiry can take any of several forms, such as providing a class number and a version number and asking if the computer 12 is storing the same class and version number, or a request to obtain the stored class and version for comparison, etc. The computer 12 responds, e.g., with an indication of whether the class and version number of the control stored in the computer 12 matches that provided by the UPS 18, or by providing the stored control, etc. and the UPS 18 determines whether the control stored by the computer 12 is the current class and version stored by the UPS 18. If the computer 12 does not have the current control 36, then the process 50 proceeds to stage 56. The process 50 proceeds directly to stage 58 if the computer 12 does have the latest version of the control 36 with an instruction from the UPS 18 to execute the currently stored control 36.

At stage 56, the ActiveX control 36 is downloaded by the computer 12 and caches the interface application. The UPS 18 downloads the current control 36 to the computer 12 using the download path from stage 54. The downloaded control 36 is pulled from the UPS 18 by the computer 12 and stored in cache, and unpacks and caches the interface application for producing the interface 40. The user of the computer 12 is prompted to acknowledge a security warning. If the user acknowledges the warning, the computer's browser installs the application into cache for execution, and otherwise the process 50 ends.

At stage 58, the ActiveX control 36 executes the interface application stored in the computer's cache memory. This application produces the interface 40 on the computer's display 20. The user of the computer 12 can interact with the interface 40 to obtain desired information regarding the UPS 18.

At stage 59, a user can control the UPS 18 by manipulating the interface 40. The user can make desired selections and/or enter desired information to control/alter a wide range of operations and/or operational parameters of the UPS 18. For example, the user can control on/off/graceful shutdown, etc. of the UPS 18 as well as adjust operational characteristics of the UPS 18 such as its sensitivity, transfer point(s), bypass ranges, etc. Other operations/characteristics may be controlled/altered as appropriate for monitored/controlled devices other than UPSs.

As FIG. 4 illustrates, there are different experiences depending upon whether the ActiveX control 36 is currently stored on the computer 12 when UPS web server is accessed. Upon initial access to the web server, or upon a further access after an update to the ActiveX control 36, the UPS 18 downloads the ActiveX control 36 which is cached and run to cache an interface application (or an updated interface application). Upon further access without an intervening update to the ActiveX control 36, the interface application may be executed without downloading the ActiveX control 36, thus saving the time used for downloading the control 36.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Furthermore, while the description above focused on a UPS in a rack of equipment, devices other than UPSs may be used, such as other networked devices. For example, networked devices such as controllable outlet products, such as MasterSwitch products made by American Power Conversion Corporation, and air conditioning products, such as FM Series products made by American Power Conversion Corporation, may be used. Further, smart generators, leak detectors, power distribution units, environmental monitoring devices, and automatic transfer switches may be monitored and/or controlled using the invention.

Furthermore, the ActiveX control 36 stored by the UPS 18 (or other device) can be a loader for determining class and/or versioning information of an interface stored at the computer 12, e.g., on the computer's hard drive. In operation, referring to FIG. 5, with further reference to FIGS. 1-3, a process 60 for providing the interface 40 to a user of the computer 12 using the system 10 with a stored loader as the ActiveX control 36 includes the stages shown. The process 60, however, is exemplary only and not limiting. The process 60 may be altered, e.g., by having stages added, removed, or rearranged.

If the computer 12 contains/stores the ActiveX loader, then the process 60 proceeds to stage 66, and proceeds to stage 62 if the computer 12 does not contain (have stored) the ActiveX loader. At stage 62, a user of the computer 12 operates a web browser of the computer 12, or a shortcut provided on the computer 12, to access a web page provided by the UPS 18 for accessing UPS information.

At stage 64, the ActiveX loader control 36 is downloaded and cached by the computer 12. The downloaded control 36 is pulled from the UPS 18 by the computer 12 and stored in cache. The user of the computer 12 is prompted to acknowledge a security warning. If the user acknowledges the warning, the computer's browser installs the loader into cache for execution, and otherwise the process 60 ends.

At stage 66, the ActiveX loader control 36 determines whether the computer 12 presently stores the current class and version of the appropriate interface application. If the computer 12 stores the current class and version of the interface application, or a plug-in between the stored class/version and the current class/version, then the process 60 proceeds to stage 70. If the computer 12 does not contain the current class and version of the interface application, or a plug-in between the stored class/version and the current class/version, then the process 60 proceeds to stage 68.

At stage 68, the ActiveX control 36 directs the computer to the web server 17 for obtaining the current class/version of the interface application. The computer 12 accesses the web server 17, e.g., according to a web address (URL) provided by the loader control 36. The computer 12 pulls/downloads the current class/version of the interface application from the web server 17.

At stage 70, the interface application stored locally in the computer 12 is executed. This application produces the interface 40 on the computer's display 20. The user of the computer 12 can interact with the interface 40 to obtain desired information regarding the UPS 18. The interface 40 may be used to control the UPS as discussed above.

Still other embodiments are within the scope and spirit of the invention. For example, the memory 32 of the UPS 18 could store an HTML page URL that the web browser of the computer 12 accesses and downloads. The HTML page URL directs the computer's web browser to the web server 17 and the web server 17 stores an ActiveX control for a Windows® interface application as described above or an ActiveX loader control as described above. The ActiveX control can be downloaded by the computer 12 and cached for future use as described above. Further, a compact disc (CD) may be provided that contains the ActiveX control (loader and/or interface application), e.g., to help with situations where/when network access is not available (ever or currently).

What is claimed is:

1. A system for use with electric equipment, the system comprising:
   a housing;
   a first input/output (I/O) device configured to couple to the electric equipment;
   a monitor coupled to the first I/O device and configured to determine information regarding the electric equipment;
   a second I/O device configured to communicate with remote computer via a communication network, the monitor being configured to provide the information regarding the electric equipment to the communication network via the second I/O device;
   a memory that stores a computer-executable program configured to be executed by the remote computer to provide a computer interface for providing indicia of the information regarding the electric equipment, the computer interface being in a format that is distinct from a network browser format; and an interface-provisioning device coupled to the memory and the second I/O device and configured to convey the computer-executable program toward the remote computer via the second input/output device and the communication network;

wherein each of the first and second I/O devices, the monitor, the memory, and the interface-provisioning device are disposed at least partially in the housing.

2. The system of claim 1 wherein the computer-executable program is configured to provide an interface when executed.

3. The system of claim 2 wherein the computer-executable program comprises the interface application.

4. The system of claim 2 wherein the computer-executable program is configured to obtain the interface application.

5. The system of claim 4 wherein the computer executable program is configured to determine whether a desired version of an interface application is stored by the remote computer and if not, then to obtain the interface application.

6. The system of claim 2 wherein the interface is a graphical-window-based interface.

7. The system of claim 1 wherein the monitor and the interface-provisioning device comprise software code.

8. The system of claim 1 wherein the system is an uninterruptible power supply system further comprising:
an AC power input configured to receive AC power;
a DC power source;
an output circuit including a power output; and
a controllable switch coupled to the AC power input, the DC power source, and the output circuit and configured to selectively couple at least one of the AC power input and the DC power source to the output circuit.

9. The system of claim 1 wherein the monitor is configured to determine information regarding at least one of air-conditioning equipment, a smart generator, a leak detector, a power distribution unit, an environmental monitoring device, and an automatic transfer switch.

10. A computer program product residing on a non-transitory computer-readable medium on a system coupled to electronic equipment, the computer program product comprising computer-readable instructions for causing a computer to:
determine indications of operation of the electronic equipment; and
convey a computer-executable program to a network toward a remote device to be executed by the remote device, the computer-executable program being configured to execute an interface application to provide a user interface for providing information regarding the operation of the electronic equipment, the interface being in a format different from a network-browser format.

11. The computer program product of claim 10 wherein the computer-executable program comprises the interface application.

12. The computer program product of claim 10 wherein the computer-executable program is configured to obtain the interface application.

13. The computer program product of claim 12 wherein the computer-executable program is configured to determine whether a desired version of an interface application is stored by the remote device and if not, then to obtain the interface application.

14. The computer program product of claim 10 wherein the interface is a graphical-window-based interface.

15. An uninterruptible power supply (UPS) system comprising:
an AC power input configured to receive AC power;
a DC power source;
an output circuit including a power output;
a controllable switch coupled to the AC power input, the DC power source, and the output circuit and configured to selectively couple at least one of the AC power input and the DC power source to the output circuit;
a first input/output (I/O) device configured to couple to electric equipment;
a monitor coupled to the first I/O device and configured to determine information regarding at least one of power use and power needs of the electric equipment;
a second I/O device configured to communicate with a remote computer via a communication network;
a memory that stores a computer-executable program configured to be executed by the remote computer to provide a computer interface for providing indicia of the information regarding the UPS system, the computer interface being in a format that is distinct from a network browser format; and
an interface-provisioning means for conveying the computer-executable program toward the remote computer via the second input/output device and the communication network.

16. The system of claim 15 wherein the interface is a graphical-window-based interface.

17. A method of providing information regarding electronic equipment, the method comprising:
monitoring operation of the electronic equipment at a first device;
receiving, at the first device, an information request regarding the electronic equipment from a network browser application of a requesting device remote from the first device;
attempting, at the first device, to determine whether the requesting device currently stores a desired version of a computer-executable user-interface program; and
executing the computer-executable user-interface program at the requesting device to produce a user interface for providing information regarding the operation of the electronic equipment, the interface being in a first format that is distinct from a second format associated with the network browser application.

18. The method of claim 17 further comprising transferring the computer-executable program to the requesting device if the attempting to determine fails to determine that the requesting device currently stores the desired version of the computer-executable user-interface program.

19. The method of claim 18 further comprising transferring the computer-executable program to the requesting device if the attempting to determine determines that the requesting device does not currently store the desired version of the user-interface computer-executable program.

20. The method of claim 17 further comprising abstaining from transferring the computer-executable program to the requesting device if the attempting to determine determines that the requesting device currently stores the desired version of the computer-executable user-interface program.

21. The method of claim 20 further comprising instructing the requesting device to execute the computer-executable user-interface program stored by the requesting device.

22. The method of claim 17 further comprising:
transferring an address of a network server accessible from the remote device to the remote device; and accessing the network server from the remote device and transferring to the remote device at least one of the computer-executable user-interface program and a computer-executable loader program configured to determine whether a desired version of the user-interface program is stored in association with the remote device.

23. The method of claim 17 wherein executing the user-interface program produces a graphical-window-based user interface.

24. The method of claim 17 further comprising controlling the electronic equipment by manipulating the user interface.

25. A computer program product residing on a non-transitory computer-readable medium and comprising computer-readable and computer-executable instructions for causing a computer to:

execute an interface-producing program to produce a graphical-window-based user interface on a display of a first device for providing information regarding the operation of electronic equipment, wherein the electronic equipment is monitored by a second device remote from the first device; and determine whether a desired version of the interface-producing program is stored in association with the first device.

26. The computer program product of claim 25 wherein the instructions are configured to cause the computer to access a remote server and download the desired version of the interface-producing program if the computer program product fails to cause the computer to determine that the desired version of the interface-producing program is stored in association with the first device.

27. The system of claim 1 wherein the interface-provisioning device is configured to convey the computer-executable program toward the remote computer via the second input/output device and the communication network in response to a determination that the remote computer is not presently storing a latest version of the computer-executable program.

28. The system of claim 27 wherein the interface-provisioning device is configured to make the determination that the remote computer is not presently storing the latest version of the computer-executable program.

* * * * *